Jan. 21, 1941.   W. E. NICHOLOY   2,229,609
PROCESS OF HEAT TREATING VEGETABLES PRIOR TO CANNING
Filed Sept. 8, 1934

Inventor:
Winford E. Nicholoy

Witness:
R. B. Davison

Patented Jan. 21, 1941

2,229,609

UNITED STATES PATENT OFFICE 2,229,609

PROCESS OF HEAT TREATING VEGETABLES PRIOR TO CANNING

Winford E. Nicholoy, Columbus, Ohio, assignor to Scott-Viner Company, Columbus, Ohio, a corporation of Ohio Application September 8, 1934, Serial No. 743,241

8 Claims. (Cl. 146—219)

The present invention relates to a process for heat treating vegetables, such as peas, beans and corn.

Blanching at the present time is conducted in drums. Water is fed in such drums, and heated to a blanching temperature. Vegetables are thereafter advanced therethrough by a worm or other mechanical device. Such conventional blanchers have numerous disadvantages. These disadvantages include incomplete bathing of the vegetables in the hot water, the inability of the operator of the apparatus to maintain the water at a constant and relatively high temperature, the difficulty of the operator in maintaining an even movement of material through the blancher, and the inability to frequently change the water. Usually one supply of water is used four or five hours before changing.

The present invention provides a new process for heat treating vegetables of the type hereinbefore described whereby such vegetables are effectively cleaned, the foreign odors and tastes removed therefrom in a most efficient and expeditious manner. It has numerous other advantages over a conventional blancher.

The objects of the present invention include, among others, the provision of:

A heating and cleansing process in which the materials under treatment at all times are completely surrounded by or bathed in hot water;

A heating and cleansing process having a relatively small temperature drop during operation;

A heating and cleansing process reducing the time required for the treating of materials;

A heating and cleansing process in which the quantity of material and the quantity of hot water used therewith bear a fixed relation;

A heating and cleansing process in which accurate control of the temperature of the water is had;

A heating and cleansing process in which the hot water is reconditioned during operation.

A heating and cleansing process in which a higher temperature may be maintained for the water;

A heating and cleansing process in which the materials are scrubbed;

A heating and cleansing process of extreme simplicity; and

A heating and cleansing process which may be conducted in a tubular member.

Figure 1:
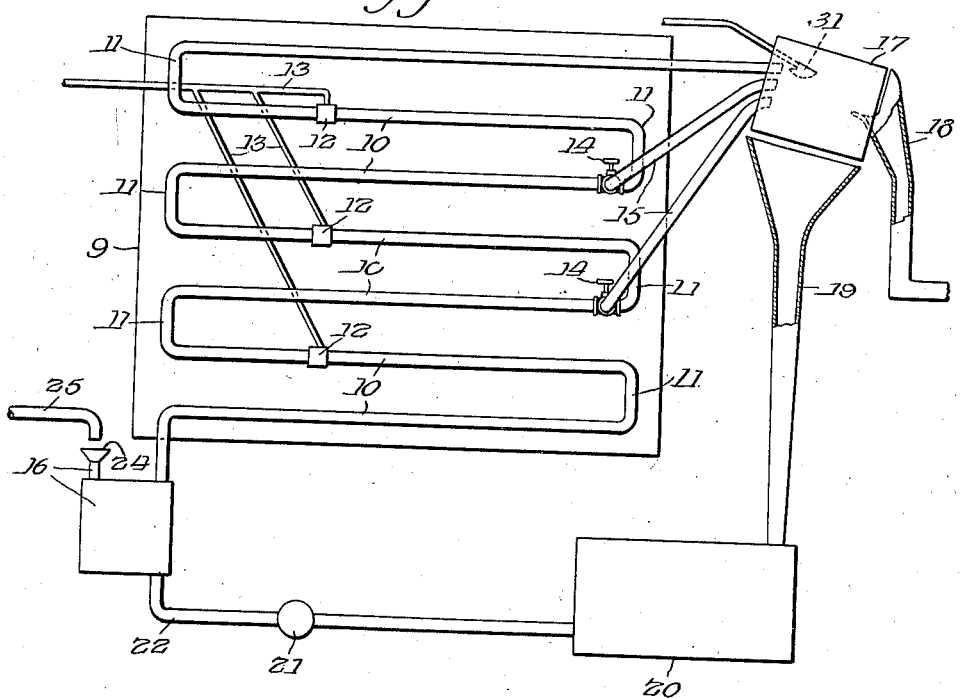
Figure 3:
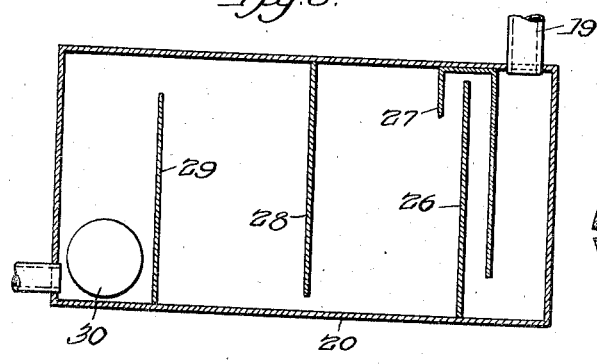
Figure 2:
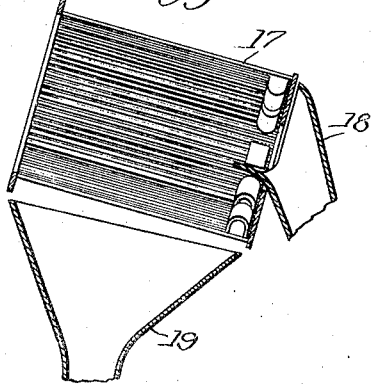

These objects, and such other objects as may hereinafter appear, are obtained by the process herein described and illustrated more or less schematically in the accompanying single sheet of drawing hereby made a part of this specification, and in which Figure 1 is an elevation of a schematic installation of an apparatus such as is hereinafter described;

Figure 2 is a detail in elevation of a separating and distributing unit used in connection with the process illustrated in Figure 1; and Figure 3 is a detail in section of a settling tank which may be employed in connection with the illustrated process.

The present invention generally relates to a process adapted to replace prior blanching operations performed on food products, including vegetables and fruits such as peas, beans and the like, prior to the canning operation. In the process of blanching food products including such articles, preparatory to canning as practiced in the prior art, both the flavor and the color of the vegetables were affected. The present invention is not concerned with the cooking or sterilizing of vegetables. On the other hand, it is concerned with the thorough washing or cleansing of the vegetables in clean, hot water, accompanied by a thorough preheating of the vegetables and their degasification, whereby to improve both the appearance and taste of the vegetables. All of these operations are accompanied by the present invention in a relatively short time, approximately one-tenth of the time, more or less, required by prior processes, and in water heated to a temperature ranging from approximately boiling temperature to substantially thereunder.

In particular, the present process is concerned with the thorough cleansing, preheating and removal of the gases from the food particles by continuously, or substantially continuously, flowing, pumping or forcing the raw food product in relatively small particles or shapes, such, for instance, as peas, beans and the like, when treating vegetables, through a closed or confined tube, conduit or column, the tubular conduit or column forming a portion of a closed liquid circulating system, and wherein the process step is provided for substantially maintaining a uniform amount of water in the circulating system and for maintaining the circulating water clean and free from the contaminating substances removed from the food particles during processing, and for maintaining the conveying and treating liquid, in which the food particles and vegetables flow through the closed tube, at predetermined temperatures selected such that the temperature of the heated water or liquid, the length of the closed tube or column, and the time required to pass the food particles through the tube or column are carried out in a relatively short time, approximately one-tenth the time heretofore required in the process of what is known as blanching peas, and preferably in a period of time substantially two minutes, more or less, and in such a manner that the cooking and sterilizing of the vegetables will be avoided.

In certain aspects of the process the water or liquid forming the transporting and heating medium for the vegetables is forced under pressure through the piping or hollow conduit in such a manner as to create a pressure. In other aspects of the invention the water is pumped upwardly through the closed tube, the water entering at the bottom of the apparatus and discharging at the top, and the pressure being created principally by the elevation or head, the same being the differential between the intake point and the elevated discharge point. In other embodiments of the invention a gravity flow through the closed piping is utilized, and the pressure is created entirely by the pipe friction and the number of turns in the piping, minus whatever effect the gravity flow has to offset this. In either instance, the loose peas, beans or food particles being processed are substantially continuously introduced in a loose condition directly into the heated liquid as it flows under pressure to or through the elongated and continuous system of piping, the heated water being used as a transporting medium and also, in part or in whole, as a processing medium, the inner walls of the piping entirely enclosing the water, forming a confined column of flowing water of relatively small cross-sectional area as compared with the length of travel of the flowing column, and into which the individual food particles, including peas, beans, corn or other vegetable, are carried along immersed in the liquid and rolling therein as they are carried along, whereby they are continuously and effectively bathed, cleansed and processed in the heated water.

In addition, the process includes the step of separating out the food particles for their ultimate canning, processing the liquid to cleanse the same, and returning it for further use.

The process also includes the step of controlling the processing effect by varying the length of the column and/or varying the velocity of travel of the column, whereby to control the duration of the heating and cleansing effect.

The process includes the step of continuously adding fresh replacement water to the liquid of the closed circulating system, either directly in the form of water itself or in the form of condensed steam; and also the step of creating periodic surges of water, material and air to assist in the cleansing action. The process includes the further step of injecting at various intervals live steam directly into the water and food particles traveling along their course of travel for the purpose of controlling the heating effect, and particularly does the process include the step of adjustably controlling the temperature of the injected steam to this end.

In addition, the process includes the step of flowing the water in a confined column or closed tube under pressure in excess of atmospheric temperature whereby in certain instances a higher temperature of heated water may be availed of and without cooking the food particles.

Like reference characters are used to designate similar parts in the drawing and in the following description.

The apparatus for carrying out the herein described process comprises a tubular structure of suitable length. The area of the tube or tubes in cross section and their shape are matters of choice. The time required for processing different commodities varies. To obtain time control the length of the tubular structure may be varied for different products. A length of tubing suitable for obtaining the longest treatment required may be installed. Valves may be disposed at suitable points in the tubular structure for shortening the course of travel of a product by eliminating a section of the tubular structure from such course. This produces a shorter treatment in point of time. Another method of controlling the length of time for processing is to employ a fixed length of tubing and to regulate the flow of hot water through such tubing. A sixty gallon a minute flow through such a system will produce a longer or more intense treatment than a four hundred gallon a minute flow.

The tubular structure may comprise a tube in a straight line. Sometimes this is not practicable because of the great length of enclosing building and of the insulating housing if one is used. A short length for the tubular members may be more desirable. Twenty feet or thereabout is highly satisfactory. Longer lengths of tubes are useful and may be substituted for the short lengths. To make the desired length the tubes are joined by connecting members such as return U-bends. The cross sectional area of the bends is the same as of the tubes. A plurality of such bends increases the pressure required to advance material through the tubes.

The tubes may be enclosed in an insulating housing to reduce loss of heat by radiation and conduction. Any suitable insulating material may be used. Steam injectors 12 which may be operated by temperature controlled mechanism may be arranged at selected intervals along the tubular course for charging the system with live steam as the water and material flow therein to maintain a predetermined minimum temperature.

The tubular course may be arranged for the conveyance of materials by gravity or by a forced flow. Preferably, the flow is forced and upward. When the flow is upward, it is against back pressure, hence the water in the conduit may be heated to and maintained at a higher temperature than in a conventional blancher where atmospheric pressure limits the temperature at which the water may be maintained. With an added back pressure of eight pounds which is easily obtainable in the present apparatus, it is possible to maintain the temperature of the water in the tubular members above two hundred degrees Fahrenheit.

In Figure 1, the various parts heretofore described are designated as follows: the insulating housing 9, the tubes 10, the return bends 11, the steam injectors 12, the conduits 13 to the injectors, the valves 14 to shorten the course of material, and the conduits 15 from such valves. The course is continuous through sections 10 and elbows 11, or through sections 10, elbows 11, a valve 15, and a conduit.

In addition to a source of live steam and of water, a feeding means and a separating and distributing means are necessary for use with the tubular conduit. The feeding means is at the receiving end of the tubes and is designated 16. The separating and distributing means is designated 17 and is at the discharge end of the tubes 10. The separator and distributor separates the processed material which falls down chute 18 from the hot water which is conveyed away through conduit 19. The water is re-used and is run through a separating supply tank 20. A pump 21 may be used to force water through the system, taking water from the tank 20 and from an outside source and pumping it through conduit 22. The tank 20 may contain a heater possessing temperature controlled operative means for maintaining a desired water temperature, a float valve for admitting a fresh supply of water when that in the system is depleted, an overflow to discharge excess water, and in addition to baffles for settling the solid matter out of the liquid, it may also have strainers or filters for the water. Hot water is sprinkled through the distributor or separator 17. The water so sprinkled may replenish the system with water to replace that which is lost by leakage, evaporation, splashing, absorption, and in other manners.

The charging device 16 shown may comprise the washer elevator illustrated in United States Letters Patent Number 1,828,488 to Mead S. Carmichael and dated October 20, 1931. The tubes in the washer elevator may be the same size as the tubes 10. Other charging devices may be used, such as a pump, for systems which include the elevation of the material. The charging device for elevated material preferably but not necessarily produces periodic surges of water and material. The washer elevator described in said Letters Patent produces such surges and is adapted to raise each succeeding charge of material and water against any normal back pressure. A fixed quantity of material, a definite volume of water, and a definite amount of air may thus be forced into the tubes 10 in rapid succession, the amount of air being governed by the capacity of the tubes in the washer elevator and the amount of material and water admitted into each tube with each charge.

When desired, additional water may be poured into the hopper 24 in the washer elevator to be mixed with the material being fed thereinto, such water flowing from tube 25 and its volume being controlled by a suitable valve. Additional water is useful in handling cut beans or other commodities that do not flow relatively freely.

If the system is actuated by gravity, a hopper for receiving material having associated therewith means for metering or controlling the flow of material therethrough is desirable. A metered flow of material and of hot water will prevent clogging of the material in the tubes.

The separator or distributor 17 comprises a rotating screen cage having a plurality of round bars supported upon annular members suitably spaced apart and so arranged that the interior of the cylinder is free from projection. The under side of the separator distributor unit includes chute 18 for material and the drain emptying the water into a conduit 19 which conveys such water to the separator supply tank 20, such as is illustrated in Figure 3.

Any other suitable tank may be used. The tank illustrated in Figure 3 comprises a compartment reservoir for hot water. The water discharged thereinto from the distributor separator unit 17 is received adjacent one end. A transverse member 26 reaches completely across the tank and is covered by an inverted U-shaped baffle 27. The tank has two additional plain baffles 28 and 29, one extending downwardly from the top of the tank and the other extending upwardly from the bottom thereof. Such arrangement of baffles divides the tank into four compartments, the last one of which may contain a heater element 30 which is employed for raising the temperature of the water in such compartment before it is withdrawn therefrom to be forced through the elevator washer and the length of tubing heretofore described. Temperature control means may be associated with the heater 30, and the tank may include a float valve and overflow to maintain a substantially fixed volume of water in the system. The baffles, and strainer and filter if used, separate all solid matter from the hot water and recondition it for reuse.

The separator distributor element has therein a spray 31 which feeds hot water over the material and which may replenish the water supply of the system as previously stated. Regulation of the volume of spray water may be such that the amount of water sprayed upon the material is sufficient to replace that which is rejected or is lost during the operation of the system. Suitable float and overflow means are inserted in the tank 20 or elsewhere in the system to maintain a fixed volume of water in the system.

When a gravity feed and discharge is employed in the system, the water will be lifted to its highest level by a suitable pump and allowed to run through the tubes 10 in a regulated manner. Charging means then may comprise simply a hopper with means for regulating the flow of material.

A description of how peas are run through the apparatus will be used for purposes of illustrating the operation of the device. Peas are now generally blanched in drum blanchers.

Peas are fed in the hopper 24 upon the washer elevator 16. From the hopper the peas pass into the revolving cylinders in the washer elevator from which they are elevated into the tubes 10 by the heated water pumped from tank 20. The peas pass through the entire length of the tubing or through a section thereof determined by a valve 14. When ejected from the tubes 10, the peas and hot water tumble into the distributor separator 17 where clear water is sprayed over the material by the spray 31. The peas, after being sprayed with hot or cold water and separated from the heated and spray water, are discharged through the chute 18 into a canning line. The peas are ready to can. The processing has consumed two minutes or thereabouts.

The hot water with the water from the spray 31 mixed therewith flows back to the settling tank 20 by way of conduit 19. In the settling tank such water flows past the several baffles therein. It is freed from refuse, split peas, foam, hulls and other dirt which is separated by mechanical means which includes a strainer or filter which remove large solid particles.

In the fourth compartment of the tank 20, the water is reheated for re-use in the system.

The temperature of the water at the time it leaves the fourth compartment of the settling tank is as near boiling as it is possible to maintain it. A measured quantity of such water is fed into each cylinder of the washer elevator with a predetermined quantity of peas falling from hopper 24. Such measured quantity of peas and hot water is lifted by the washer elevator, surge following surge, and is forced through tubes 10 and bends 11.

The peas in the tubes 10 are at all times completely immersed in water. They are bathed constantly over their entire surfaces and not upon one side as in a conventional blancher. The peas never rest one upon another and never are suspended out of water as in a drum blancher. The surging action of the water in the tubes is efficient to cleanse the peas.

The temperature of the water in the system is reduced but slightly during its transit from the washer elevator 16 to the separator distributor unit 17. Such loss in temperatures may be fully overcome by injecting steam into the tubes at the various points 12 along the course of tubes 10. The housing 9 previously described insulates the tubes 20 against material loss of heat.

Because the hot water is elevated against water and material in the tubes 10 and because of the numerous U bends 11 in the tubes 10, the peas and hot water are always moved under a pressure in excess of atmospheric pressure. On a sixteen foot lift, the pressure within the tubing is eight pounds or more above atmospheric. The entire operation thus is during a pressure in excess of that of the atmosphere. Such pressure facilitates the maintenance of a high and constant predetermined temperature for the water. It is possible to maintain a temperature approximating that of boiling water, something which has been impossible in the conventional type of drum blancher. Because of the increased pressure, the complete bathing of the peas, the friction of the tubes and elbows, the higher temperature of the water, the surging action of the water, and the definite apportionment of a volume of peas to a volume of water throughout the entire operation, highly efficient results are obtained. Processing is accomplished in one tenth the time required in a conventional drum blancher. A blanch of twenty minutes in a conventional blancher may be had in two minutes in tubes 10. The peas which have been washed and processed by the treatment herein described and in apparatus of the type herein illustrated possess a higher quality than peas of the same grade which have been run through a conventional blancher. In numerous instances, it has been noted that the grade or quality of the peas has been improved because of the uniformity obtained in the cleansing and heating thereof.

Cut beans are processed in the same manner as peas. Hot water, however, may be poured upon the beans into the hopper 24 upon the washer elevator and mixed with the beans before their admission to the tubes in the washer elevator to facilitate loading. This is desirable because the flat ends on the beans causes them to lodge in the elevator. The same arrangement is necessary in a gravity system for processing cut beans.

Many variations in the apparatus may be had without departing from the spirit of the invention which comprises in part processing by enclosing the material in a vessel insuring that each article will be at all times completely bathed in water and with the water maintained at a higher temperature than has heretofore been possible.

It has been thought unnecessary to illustrate a gravity operating system as its manner of operation should be clear from the herein given description thereof. A pump, of course, is necessary to lift the hot water from the separator distributor tank to a position contiguous to the hopper.

What I claim is new and desire to secure by Letters Patent of the United States is:

1. The herein-described process of blanching food, comprising conveying a mixture of heated liquid and food particles through a hollow conduit, and varying the length of said conduit to vary the time that said mixture is confined within said conduit.

2. The herein-described process of thoroughly heating and cleansing leguminous vegetables such as peas, beans and the like prior to canning which comprises forcing water heated to approximately boiling temperature in a substantially elongated confined column of relatively small cross-section compared to its length, introducing the leguminous vegetables into the column of water, immersing the leguminous vegetables completely in the water during their travel, applying heat to the confined column of water at stations spaced along the column to maintain substantially uniform the temperature of the water, maintaining the water under a back pressure decreasing in the direction of flow, separating the leguminous vegetables from the water, adding a relatively small quantity of fresh water to the water in which the vegetables were immersed and after separation of the leguminous vegetables from the water, and returning the replenished water under pressure to the column.

3. The herein-described process of processing food particles such as peas, beans and the like prior to canning, which comprises transporting the food particles in a confined column of flowing water, heating the water slightly below boiling temperature, injecting live steam under pressure directly into the column of water into contact with the water and the food particles during their travel in the confined column and regulating the time of travel of food particles in the water to a period less than five minutes and sufficient to cleanse and degasify the food particles, but insufficient to cook the food particles.

4. The herein-described process of blanching food, comprising conveying a mixture of heated liquid and food particles through a hollow conduit, maintaining the mixture as it flows through the conduit at a temperature between boiling and somewhat thereunder, and varying the length of the conduit to vary the time that the mixture is confined within the conduit.

5. The herein-described process of treating food comprising conveying a mixture of heated liquid and food particles through a hollow conduit, injecting steam through the conduit into the mixture at points spaced along the conduit, and varying the length of said conduit to vary the time that said mixture is confined within the conduit.

6. The process of preparing vegetables and the like for canning in a relatively long conduit having closed walls in the form of a substantially pipe-like member of relatively small cross-section as compared with its length, which process consists in introducing hot water at one end of said conduit and forcing the water to travel throughout the length of the conduit in such a manner as substantially completely to fill the entire cross-sectional area of the conduit throughout its length, meanwhile introducing the vegetables into said conduit at the said one end thereof and causing them to be bodily carried along while being completely carried and bathed in the hot water, continuously separating the vegetables from the water at the other end of said conduit while returning the water back to that end of the conduit at which the water was first introduced in a complete and continuous cycle, continuously applying heat to the water at a plurality of stations along the conduit whereby to maintain the water at a relatively high temperature 7. The process of preparing vegetables and the like for canning which consists in providing a relatively long conduit having closed walls in the form of a substantially pipe-like member of relatively small cross-section compared with its length, introducing hot water at one end of said conduit and forcing the water to travel throughout the length of the conduit in such a manner as to completely fill the entire cross-sectional area of the conduit throughout its length, meanwhile introducing the vegetables into said conduit at one end thereof whereby to cause them to be bodily carried along while being completely surrounded and bathed in the hot water, continuously separating the vegetables from the water at the other end of said conduit while returning the water back to that end of the conduit at which the water was first introduced in a complete and continuous cycle, continuously injecting steam into said flowing water at a plurality of spaced apart points extending longitudinally of the conduit whereby to maintain the temperature of the water around boiling temperature.

8. The herein described process of heat treating peas, beans, and like vegetables comprising substantially continuously introducing the vegetables in a continuously flowing confined column of hot water, whereby to cause said hot water to carry said vegetables bodily along therewith, the vegetables being completely immersed and bathed in said water as they flow along, continuously injecting steam directly into said water at a plurality of spaced apart points along said confined column whereby to maintain a predetermined temperature of the flowing water around boiling or somewhat thereunder, regulating the period of travel of the peas, beans, and like vegetables in hot water to maintain the time of treatment sufficiently long to degasify the vegetables, but sufficiently short to avoid cooking.

WINFORD E. NICHOLOY.